United States Patent Office 2,921,023
Patented Jan. 12, 1960

2,921,023

REMOVAL OF NAPHTHENIC ACIDS BY HYDROGENATION WITH A MOLYBDENUM OXIDE-SILICA ALUMINA CATALYST

Le Roy W. Holm, Crystal Lake, Ill., assignor to The Pure Oil Company, Chicago, Ill., a corporation of Ohio No Drawing. Application May 14, 1957
Serial No. 658,975

11 Claims. (Cl. 208—263)

This invention relates to a method of increasing and maintaining the activity of molybdenum oxide-alumina and molybdena-alumina-silica catalysts during the hydrogenation of organic materials under relatively mild conditions by a particular pretreatment technique.

The prior art discloses many methods, catalyst compositions and operating techinques for conducting catalytic hydrogenation reactions. Although hydrogenation reactions are widely used in laboratories without regard to catalyst life and activity, these attributes cannot be ignored when the processes are put on a commercial scale wherein yield per pass and duration of catalyst activity are of prime importance. Catalytic reforming and catalytic hydrogenation processes are today two of the most important and rapidly growing processes in petroleum technology. Catalyst activity and life are also of economic importance in other industries employing hydrogenation, such as the treatment of fats and oils, the treatment of gaseous hydrocarbons, and carbonaceous materials such as coal, shale, and bitumin.

Within the petroleum industry the current expansion in catalytic hydrogenation capacity is at least in part due to the depletion of low-sulfur crude petroleum sources and the high sulfur content of newly discovered crude sources. Other factors are the increased use of cracking and coking, causing a concentration of undesirable compounds of sulfur, nitrogen and oxygen in heavier fractions, the need for higher octane motor fuels, better lubricating oils and the necessity of preventing poisoning of expensive catalysts. By-product hydrogen from catalytic reforming operations has made catalytic hydrogenation processes more economical on a commercial basis. The principal reactions involved are the conversion of sulfur compounds to hydrogen sulfide, the transformation of nitrogen compounds to ammonia, the reduction of the oxygen in phenols and peroxides, and the saturation of double bonds. Cobalt oxide-molybdenum oxide catalysts have received the greatest amount of attention and development for these reactions as evidenced by the trickle hydrodesulfurization process developed by Royal Dutch-Shell, the hydrofining process of Esso Research and Engineering, Sinclair Refining Company's hydrodesulfurization process and such other processes as autofining, unifining, etc.

Some processes are designed to use molybdenum oxide-containing catalysts for treating reformer feeds, middle distillates, light cycle oil, burning oil distillates and lubricating oils. These processes are conducted at temperatures from about 580° to 800° F. and have capacities ranging from 3000 to 16,000 b.p.s.d. It is reported that with some of these processes a single, 1000-barrel-per-day unit using a molybdenum-type catalyst has maintained the catalyst activity for about 20 months without regeneration when operating on a catalytic reformer charge. In others, catalyst regeneration may be required at periods ranging anywhere from 2 to 10 months, with cracked naphthas as the feed. This long catalyst life is not experienced in treating heavier feed stocks such as sulfur-containing lubricating oils, their residual and distillate fractions, and, in general, the heavier fractions of petroleum. To the end that longer catalyst life and activity may be attained in these types of hydrogenation reactions using molybdenum oxide catalysts, this invention is devoted.

According to this invention, it has been found that molybdenum oxide-containing catalysts may be given prolonged life and activity by a specific treatment of the fresh or used catalyst comprising heating the catalyst with air or an oxygen-containing medium at a temperature of from 1000 to 1300° F. prior to use in the hydrogenation of heavy petroleum fractions including deasphalted residual fractions. By pretreating the fresh catalyst in this manner, or including this pretreatment step in a certain sequence with regeneration operations, as will be described, there results a more complete reduction of any oxy-compounds in the feed, and a more complete saturation of olefins, at higher liquid volume hourly space velocities and with a longer catalyst life. Furthermore, the catalyst pretreatment method of this invention does not affect the activity of the catalyst with respect to sulfur removal so that the process can be used to advantage where it is desired to leave intact those naturally-occurring sulfur compounds which are known to be oxidation inhibitors. It has been found that the superior activity of the molybdena-containing catalyst is related to the reversible water content of the catalyst which should be reduced to and maintained at a value of no more than 1.0 weight percent.

It, therefore, becomes a primary object of this invention to provide a process of hydrogenating heavy petroleum fractions in the presence of molybdenum oxide-containing catalysts wherein the catalyst activity and life are prolonged and the product characteristics sustained over extended period of use.

Another object of the invention is to provide a process for pretreating a fresh molybdenum oxide-containing catalyst by heating with an oxygen-containing medium at elevated temperatures to produce a catalyst which exhibits prolonged life and high activity for hydrogenating lubricating oils.

A further object of the invention is to provide a process of catalyst regeneration including the step of heating with air at certain elevated temperatures whereby the reversible water content of the catalyst is reduced to and maintained at a value of no more than 1.0 weight percent.

These and other objects will be described or become apparent as the description proceeds.

The catalysts which have been found to be susceptible to the treatment of my invention range in composition from 2 to 10% w. molybdenum oxide on a base of 15 to 100% w. alumina and 85 to 0.0% w. silica. The operating conditions for mild hydrogenation with these catalysts may vary over only relatively narrow ranges, viz., 450° to 600° F., 100 to 500 p.s.i.g., 0.5 to 2.0 lv./v./hr., and 1000 to 3000 s.c.f. $H_2$/bbl.

In order to demonstrate the invention, a series of experiments was conducted to show the effect of various pretreatment steps on samples of fresh catalyst. The charge oil used in these experiments was a medium lubricating oil distillate having the following characteristics:

| | |
|---|---|
| ° API | 24.2 |
| Vis., SUS @ 100° F. | 241.3 |
| Vis., SUS @ 210° F. | 47.4 |
| Viscosity index | 76 |
| Neut. No. (1948) | 3.03 |
| Sulfur, percent w. | 1.13 |
| Color, NPA | 4+ |

The results are shown in Table I.

TABLE I

| Run No | 24 | 10 | 35 | 36 | 33 | 37 |
|---|---|---|---|---|---|---|
| Catalyst | 9% Molybdenum Oxide on 99% alumina—1% silica. | Same as Run 24 | 9% Molybdenum oxide on 99.7% alumina—0.3% silica. | Same as Run 35 | 10% Molybdenum oxide on 15% alumina—85% silica. | Same as Run 33. |
| Pretreatment Before Run | Preheated in air @ 650° F. for 3 hours. | Preheated in air @ 1250° F. for 3 hours. | Preheated @ 800° F. for 4 hours with 4 s.c.f./hr., purge of hydrogen. | Preheated at 1,150° F. for 3 hours in air. | Preheated @ 800° F. for 4 hours with 4 s.c.f./hr. purge of hydrogen. | Preheated @ 1,150° F. for 3 hrs. in air. |
| Temp., °F | 557 | 543 | 570 [1] | 555 | 599 | 590. |
| LVHSV | 1.0 | 1.0 | 1.0 | 1.3 | 1.2 | 1.4. |
| Pressure, p.s.i.g | 250 | 250 | 250 | 250 | 250 | 250. |
| H₂ Rate, s.c.f./bbl | 2,300 | 2,000 | 2,500 | 2,600 | 2,600 | 2,500. |
| Length of Run, hrs | 55 | 147 | 41 | 49 | 36 | 26. |
| Product Inspection: | | | | | | |
| Neut. No. (1948) 1st hr | <0.03 | <0.03 | <0.03 | <0.03 | <0.03 | <0.03. |
| Neut. No. (1948) 3rd hr | <0.03 | <0.03 | <0.03 | <0.03 | 0.04 | <0.03. |
| Neut. No. (1948) 8th hr | 0.03 | <0.03 | 0.12 | <0.03 | 0.06 | <0.03. |
| Neut. No. (1948) 15th hr | 0.12 | <0.03 | 0.10 | <0.03 | 0.06 | <0.03. |
| Neut. No. (1948) 20th hr | 0.11 | <0.03 | 0.11 | <0.03 | 0.08 | <0.03. |
| Neut. No. (1948) 36th hr | 0.11 | <0.03 | 0.12 | <0.03 | 0.09 | <0.03. |
| NPA color 3rd hour | 3½ | +2 | 3½+ | +2 | 2½+ | 2. |

[1] At the same temperature as in Run 36, i.e., 550° F., the acid number of the treated product was 0.16 after the 6th hour.

In runs 10, 36 and 37, where the catalysts had been preheated in air at 1150° F. for 3 hours, more complete removal of organic acids at appreciably higher liquid volume hourly space velocities, and for longer periods of time, was observed in comparison to the results of other runs where other pretreatment procedures were followed.

During the pretreatment of the catalyst at temperatures ranging from 650° F. to about 950° F. in an oxygen-containing atmosphere, the reversible water content ranges from about 1.35 wt. percent at the 650° F. level to about 1.08 wt. percent at the 950° F. level with a water vapor pressure of about 0.5 mm. Hg in the environment of treated air. At any given temperature between 650° F. to 950° F. the reversible water content increases as the water vapor pressure of the environment increases but never falls below 1.0 wt. percent; only at a temperature of 1000° F. or above does the reversible water content of the molybdenum oxide approach 1.0 weight percent to give sustained catalytic life. Accordingly, the time of heating at 1000° F. or above should be sufficient to reduce the water vapor pressure to a value below about 1.0 mm. Hg under the conditions imposed. The approach to equilibrium conditions is gradual and slow, and longer times will be required to reach a reversible water content of 1.0 wt. percent when pretreating the catalyst at 1000° F., than would be required at temperatures of above 1000° F. At pretreating temperatures of 1000° F. the time required is at least three hours. Heating at 1150° F. to 1250° F. in the presence of air for at least two and preferably three hours assures attainment of the desired reversible water content. Additional experiments not shown herein established that heating the catalyst to 650° F. for 3 hours, or to 650° F. for 16 hours, or to 800° F. for 4 hours did not result in the high initial catalytic activities or acid number reduction observed in the experiments shown in Table I. Effective acid number reductions can be obtained by preheating the catalyst for as little as 2 hours at 1150° F. or 1250° F. The upper limit of the temperature of pretreating has been established to be about 1300° F. at which temperature equilibrium and the minimum reversible water content are attained in less than about two hours. Heating to temperatures much above 1300° F. is to be avoided, since destruction of the ability of the catalyst to reduce oxy-compounds results and the catalytic activity toward sulfur compounds is increased. This is apparently due to partial transformation of the molybdenum oxide from the trioxide to the pentoxide.

The invention is applicable to various types of feed stocks which contain oxy-compounds and/or olefinic compounds that are amenable to hydrogenation under relatively mild conditions. Feed stocks which contain desirable sulfur compounds in addition to oxy-compounds or olefinic compounds may be treated with particular advantage where it is the object to reduce oxy-compounds and olefins while leaving the sulfur compounds unaffected. Feed stocks may comprise substantially only oxy-compounds and/or olefinic compounds as, for example, naturally-occurring or synthetic products in which class are included naphthenic acids, carboxylic acids, esters of organic esters, glycerides, oils, fats, waxes, oxygenated hydrocarbons, gaseous or liquid olefinic mixtures, diolefins, etc. The sulfur compounds include the wide variety of compounds that may be associated with various naturally-occurring and synthetic mixtures that require treatment as by mild hydrogenation. Specific examples are thio-acids, mercaptans, sulfur-containing organic compounds and polymeric compounds present as residual sulfur compounds in refined lubricating oil fractions which are beneficial and not affected by the catalyst and hydrogenation conditions of this invention.

The invention has particular application in the mild hydrogenation of heavy petroleum fractions, including residues from petroleum distillation and residues which have been deasphalted. Neutral lubricating oil stocks and bright stocks may be treated in accordance with the invention for the purpose of reducing the acid number, while at the same time leaving the residual sulfur compounds intact. Examples of lubricating oil feed stocks are given in the following Table II.

Dry air has been specified as promoting the desired result. For this purpose it is only necessary to pass the air used during the preheating step through a dehydrating agent, such as calcium chloride. Various metal salts, absorbents or desiccants may be used for this purpose. The water content of the air should be reduced to about 0.05 to 0.1 percent by volume so that the water vapor pressure of the heated air is less than about 1.0 mm. Hg at 1000° F.

From this description it is apparent that the invention relates broadly to the process of preferentially hydrogenating oxy-compoundss and/or olefinic compounds in the presence of sulfur compounds contained in organic mixtures, without affecting the sulfur compounds, by subjecting the organic mixtures to the action of hydrogen at temperatures between about 450° to 600° F. in the presence of a molybdenum oxide containing catalyst having a reversible water content of less than about 1.0 weight percent. The improved results of long catalyst life with concomitant reduction of the oxy-compounds and/or olefinic compounds without affecting the sulfur compounds are obtained by periodically regenerating or contacting the catalyst with an oxygen-containing atmosphere at a temperature of about 1000° F. for a time suffi-

TABLE II

Hydrogenation charge oils

| No. | Description | @ 100° F. | @ 210° F. | VI | Neut. No. | ° API | Total Sulfur, Wt. Percent | Conradson C. R., Wt. Percent |
|---|---|---|---|---|---|---|---|---|
| 1 | Heavy deasphalted oil | 2,900 | 165.6 | 96 | 0.80 | 22.9 | | 1.87 |
| 2 | Medium neutral distillate | 243.2 | 47.4 | 74 | 2.9 | 24.2 | 1.13 | 0.11 |
| 3 | do | 242.1 | 47.4 | 76 | 2.9 | 24.0 | 1.13 | 0.05 |
| 4 | Heavy deasphalted oil | 3,200 | 170.7 | 93 | 0.85 | 21.5 | 1.10 | 2.0 |
| 5 | Medium neutral distillate | 243.8 | 47.5 | 75 | 3.03 | 21.3 | 1.15 | 0.07 |
| 6 | Heavy deasphalted oil | | 181 | 87 | 1.6 | 21.6 | 1.23 | 2.23 |
| 7 | Neutral distillate | 241.3 | 47.4 | 76 | 3.03 | 24.2 | 1.13 | |
| 8 | Heavy deasphalted residuum | | 177.2 | | 1.51 | 21.7 | 1.14 | 1.96 |
| 9 | do | | 175.8 | | 1.64 | | 1.23 | 2.0 |
| 10 | Solvent-refined neutral dist | | 37.5 | 90 | 0.15 | 34.0 | 0.12 | 0.01 |
| 11 | do | 200 | 46.0 | 90 | 0.30 | 28.5 | 0.45 | 0.02 |
| 12 | do | 800 | | 90 | 0.35 | 27.0 | 0.60 | 0.25 |
| 13 | Solvent-refined bright stock | 2,400 | 153.0 | 100 | 0.25 | 26.5 | 0.45 | 0.60 |
| 14 | do | 3,300 | 170.0 | 90 | 0.45 | 24.3 | 0.75 | 1.2 | cient to produce a catalyst which has the ability to again produce a product having a reduced oxy-compound content or reduced olefin content or both, or which catalyst has a reversible water content of less than about 1.0 weight percent. The process may be applied using batch operation, fixed catalyst beds, moving catalyst beds or fluid-type reactors. Such techniques may be applied to the catalyst regeneration step as well. Any of the methods of hydrogenating organic mixtures known to the art may be applied so no further detailed description is necessary. Also, the preparation and use of molybdenum oxide-alumina-silica catalyst is known and need not be described. The invention may be practiced by improving existing techniques to the extent that the particular regeneration step is applied in order to maintain the catalyst in the particular state of activity observed herein. The important consideration is to treat the new or used catalyst with an oxygen-containing atmosphere at 1000° F. or more for a time sufficient to attain this sustained activity, which may be measured by its reversible water content, and maintain this state of activity during that portion of the reaction in which the hydrogenated products constitute the refined product recovered. Newly prepared catalysts may be beneficiated, since, even though they may have been calcined at 1200° F. during their preparation, they are generally exposed to the atmosphere during packaging, shipment or use. The invention is expressly defined by the appended claims.

What is claimed is:

1. The process for preferentially hydrogenating naphthenic acids in the presence of sulfur compounds in a lubricating oil portion which comprises subjecting said mixture to the action of hydrogen at a temperature of about 450° to 600° F., at a pressure of about 100 to 500 p.s.i.g., a space velocity of about 0.5 to 2.0 lv./v./hr. and with about 1000 to 3000 s.c.f. of hydrogen per barrel of said petroleum oil mixture, in the presence of a catalyst consisting of about 2.0 to 10.0 weight percent of molybdenum oxide on a silica-alumina support, said catalyst having a reversible water content of less than 1.0 weight percent, maintaining the activity of said catalyst by periodically contacting said catalyst in the absence of said petroleum oil mixture with an oxygen-containing atmosphere at a temperature of at least about 1000° F. for a period of about 3 hours, and recovering a hydrogenated product having a neutralization number of below about 0.03 and substantially the same sulfur content.

2. The process in accordance with claim 1 in which the catalyst comprises about 9 weight percent molybdenum oxide on a support comprising about 99.0 weight percent alumina and about 1.0 weight percent silica.

3. The process in accordance with claim 1 in which the catalyst comprises about 9 weight percent molybdenum oxide on a support comprising about 99.7 weight percent alumina and about 0.3 weight percent silica.

4. The process in accordance with claim 1 in which the lubricating oil fraction has been solvent-refined and deasphalted and has a sulfur content of above about 0.45 weight percent and a neutralization number of above about 0.25.

5. The process in accordance with claim 4 in which the lubricating oil is selected from the group consisting of bright stocks, neutral oils, heavy petroleum residues, deasphalted oils and medium distillates.

6. In the process of hydrogenating a petroleum lubricating oil for the purpose of reducing the naphthenic acid content without affecting the content of naturally-occurring sulfur compounds by hydrogenation in the presence of a catalyst consisting of about 2.0 to 10.0 weight percent of molybdenum oxide on a silica-alumina support, the improvement comprising passing said petroleum lubricating oil into contact with said catalyst, maintaining said reaction at a temperature of about 450° to 600° F. with a space velocity of about 0.5 to 2.0 lv./v./hr., with about 1000 to 3000 s.c.f. of hydrogen per barrel of said petroleum lubricating oil, and maintaining the activity of said catalyst by periodically contacting said catalyst in the absence of said petroleum lubricating oil with an oxygen-containing atmosphere at a temperature of at least about 1000° F. for a period of about 3 hours so that the reversible water content of said catalyst is maintained at a value of less than about 1.0 weight percent and recovering a petroleum lubricating oil having a neutralization number of less than about 0.03 and substantially the same sulfur content.

7. The process in accordance with claim 6 in which the catalyst comprises about 9.0 weight percent of molybdenum oxide on a support comprising about 99.0 weight percent alumina and about 1.0 weight percent of silica.

8. The process in accordance with claim 6 in which the catalyst comprises about 9.0 weight percent of molybdenum oxide on a support comprising about 99.7 weight percent alumina and about 0.3 weight percent silica.

9. The process of refining lubricating oils containing naturally-occurring sulfur compounds and acidic compounds for the purpose of enhancing the physical properties and reducing the neutralization number without reducing the content of said sulfur compounds which comprises subjecting said lubricating oil to contact with hydrogen at a temperature of between about 450° and 600° F. in the presence of a catalyst consisting of about 2.0 to 10.0 weight percent of molybdenum oxide on a silica-alumina support, said catalyst having a reversible water content of less than about 1.0 weight percent and recovering a refined lubricating oil characterized by having a neutralization number (1948 method) of below about 0.03 and the original content of naturally-occurring sulfur compounds.

10. The process in accordance with claim 9 in which said catalyst is prepared by heating to a temperature of at least about 1000° F. for about 3 hours in the presence of an oxygen-containing atmosphere to reduce the reversible water content thereof to a value below about 1.0 weight percent prior to use in said reaction.

11. The process in accordance with claim 9 in which the molybdenum oxide-containing catalyst is periodically treated in the absence of said lubricating oil with an oxygen-containing atmosphere at a temperature of at least about 1000° F. for about 3 hours to reduce the reversible water content to a value of below about 1.0 weight percent.

References Cited in the file of this patent

UNITED STATES PATENTS

| | | |
|---|---|---|
| 2,406,081 | La Lande et al. | Aug. 20, 1946 |
| 2,422,172 | Smith et al. | June 10, 1947 |
| 2,486,361 | Nahin et al. | Oct. 25, 1949 |
| 2,654,696 | La Porte | Oct. 6, 1953 |
| 2,706,167 | Harper et al. | Apr. 12, 1955 |
| 2,734,019 | Miller et al. | Feb. 7, 1956 |
| 2,779,711 | Goretta | Jan. 29, 1957 |